United States Patent
Allaud

[15] 3,683,688
[45] Aug. 15, 1972

[54] METHOD AND APPARATUS FOR THERMOMETRIC WELL LOGGING

[72] Inventor: Louis A. Allaud, Paris, France

[73] Assignee: Schlumberger Technology Corporation, New York, N.Y.

[22] Filed: Dec. 16, 1970

[21] Appl. No.: 98,814

[30] Foreign Application Priority Data

Jan. 6, 1970 France..................7000197

[52] U.S. Cl. ................................................73/154
[51] Int. Cl. ..........................................E21b 47/06
[58] Field of Search ..........................73/154; 166/64

[56] References Cited

UNITED STATES PATENTS 3,122,016  2/1964  Fordham....................73/154
3,480,079  11/1969  Guinn et al. .............73/154 X Primary Examiner—Jerry W. Myracle
Attorney—Ernest R. Archambeau, Jr., John P. Sinnott, Stewart F. Moore, David L. Moseley, Edward M. Roney and William R. Sherman

[57] ABSTRACT

An illustrative embodiment of the present invention includes methods and apparatus for temperature logging of oil wells having thermal anomalies. After having determined the geothermal gradient of the borehole, a signal representing the temperature at each point of the borehole is generated and from this a second signal equal to the product of the gradient and the depth of the point is subtracted. This generates a signal representative of only the thermal anomalies in the well. Apparatus for performing the method includes a compensation signal generator which can be set in accordance with the gradient and which is capable of multiplying the gradient by the depth reached. A depth signal for this purpose is generated as known in the prior art by a measuring wheel driven by movement of the logging cable.

9 Claims, 6 Drawing Figures

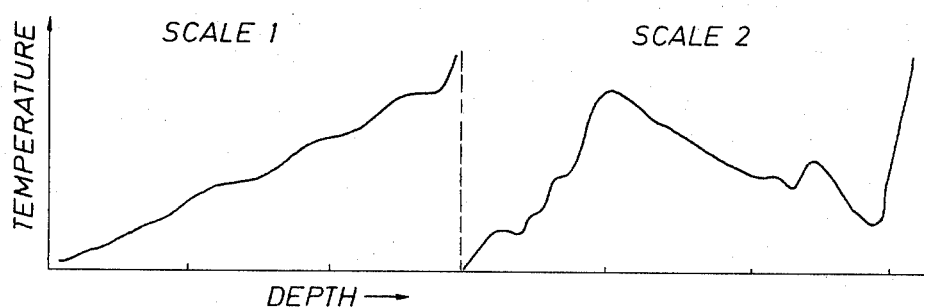
FIG.1
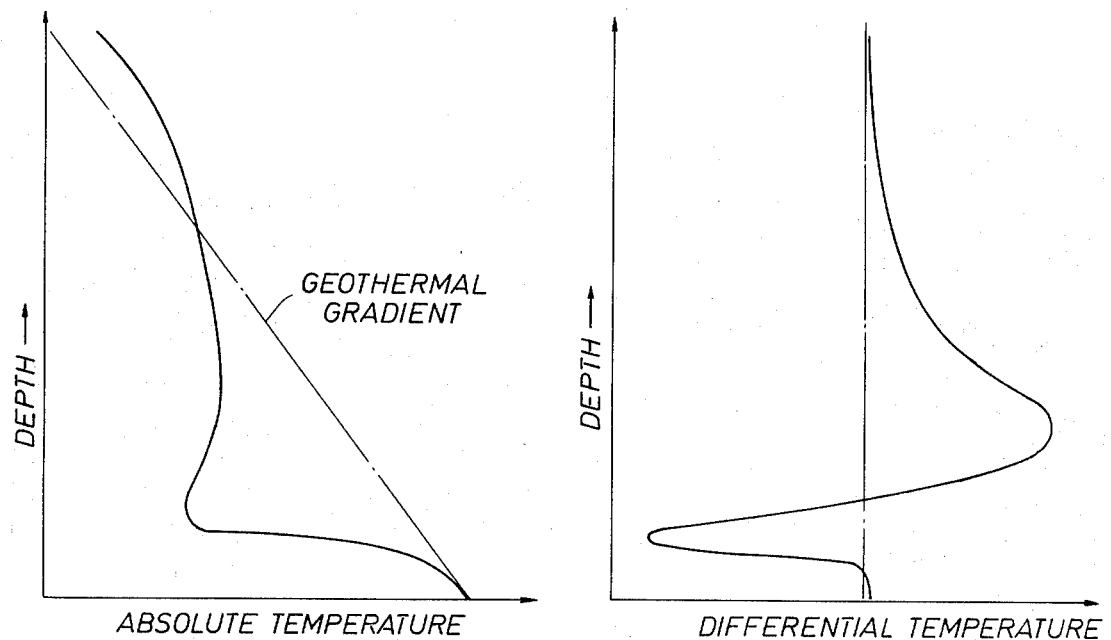
FIG. 2A
FIG. 2B
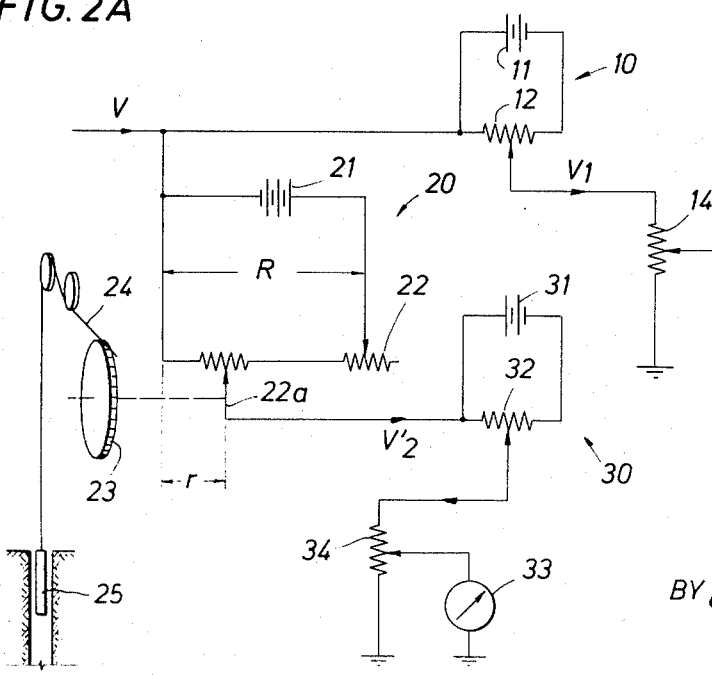
FIG. 3
Louis A. Allaud
INVENTOR
BY William J. Beard
ATTORNEY Louis A. Allaud
INVENTOR BY William J Beard

ATTORNEY

METHOD AND APPARATUS FOR THERMOMETRIC WELL LOGGING

The present invention relates to well logging and more particularly to improvements in processes and apparatus used in thermometric well logging operations.

In prior art temperature or thermometric well logging operations the thermometry operation has consisted of recording the temperature of formations through which a sonde passes as a function of the borehole depth of such formation. This method has been particularly useful for solving very special problems such as determining the level of the cementation top, the location of inflows of gas or water, the location causing mud losses, and others.

In the following description, it shall be assumed that the general means used for these well logging operations are well known. In particular the galvanometer type photographic recorder or the digital data magnetic recorder, the cable, and the sonde which, in this case, is a thermometer, may all be of types which have previously been proven successful.

In prior art temperature logging systems which record absolute temperature as in function of depth, the geothermal gradient has been troublesome because, in the absence of any temperature anomaly, it generally takes the form of a straight line of constant slope. This line of constant slope is not in itself of any major interest. What is usually of more interest and importance are the deviations of the recorded curve called the "thermal log" or "temperature log" in relation to this straight line. Such deviations represent the anomalies or unusual portion of the well.

In the past attempts to amplify or to make more apparent the deviations from the straight line by increasing the sensitivity of the measurement, the geothermal gradient is amplified in the same proportion. This merely changes the scale of the recording curve and causes it to more easily go off scale on the recorder strip. This then requires a recorder scale change which is done by resetting on the original abscissa by applying a suitable scale change voltage on the galvanometer. Under these conditions the thermal log then shows numerous discontinuities and becomes extremely difficult to interpret (see FIG. 1).

For this reason, processes have been proposed which record the so-called differential temperature with respect to depth or with respect to time (which amounts to the same thing if the sonde logging speed is kept constant). The differential temperature is the difference in temperature between two spaced points in the well bore. This allows the possibility of amplifying temperature anomalies, to the entire extent permitted by the galvanometer scale. This results because the apparent curve "sliding" due to the geothermal gradient cancels out since this gradient is practically constant. This process, however, has the serious disadvantage of completely modifying the shape of the thermal log curves. Thus, for example, FIG. 2A (absolute temperature) representing an inflow of gas is transformed into the curve of FIG. 2B (differential temperature) which is much more difficult to interpret. In fact, the anomaly studies which have been conducted in the past and the available curve catalogs, known in the art, were established in absolute temperature, and although it is theoretically possible to conduct them again on the basis of differential temperature, it is still usually more convenient to think in turns of absolute temperature for interpreting a thermal log curve.

The mental adaptation from a curve such as that of FIG. 2A is made even more difficult by the fact that in practice the former (differential temperature) does not really represent the derivative of the temperature Q in relation to the depth z (or to time t) in the analytical sense of the term but a measuring of values $\Delta Q$ corresponding to finite intervals $\Delta Z$.

Accordingly, an object of the present invention is to combine the advantages of the two preceding recording processes while eliminating the disadvantages of both.

A further object of the present invention is to provide an improved method and apparatus for recording thermal borehole logs.

In accordance with the objects of the present invention a method of recording which eliminates the term corresponding to the geothermal gradient from the thermometric gradient prior to its recordation is provided. The geothermal gradient of the borehole is determined and a signal representation thereof is generated. A quantity proportional to the product of the geothermal gradient signal and the depth of the point is generated and this signal subtracted from the absolute temperature signal at each point. This process generates a signal representative of only the thermal anamolies of the borehole.

To permit the implementation of the process, a device in accordance with the invention comprises the usual recorder elements known in the art such as the thermometric sonde and film strip recorder. Additionally, the device employs a compensation signal generator comprising either a constant voltage source supplying a potentiometer whose sliding contact is mechanically coupled to an adjustable wheel driven by the cable, or a rotary transducer integral with a measuring wheel driven by the cable and delivering pulses to be counted, a binary counter, and an analog-to-digital converter with adjustable reference.

Additionally, the apparatus includes means of subtracting the compensation signal from the signal delivered by the sonde so as to apply the resultant signal to the recorder.

The novel features of the present invention are pointed out with particularity in the appended claims. The present invention will be better understood through the following description thereof when taken in conjunction with the accompanying drawings, wherein:

BRIEF DESCRIPTION OF THE DRAWINGS

FIG. 1 is a conventional thermal log diagram as known in the prior art shown having two different scales at different depths.

FIGS. 2A and 2B are corresponding thermal log diagrams respectively in absolute temperature and in differential temperature.

FIG. 3 is a layout diagram of an analog apparatus according to the invention.

DESCRIPTION OF THE PREFERRED EMBODIMENTS

Figure 3A:
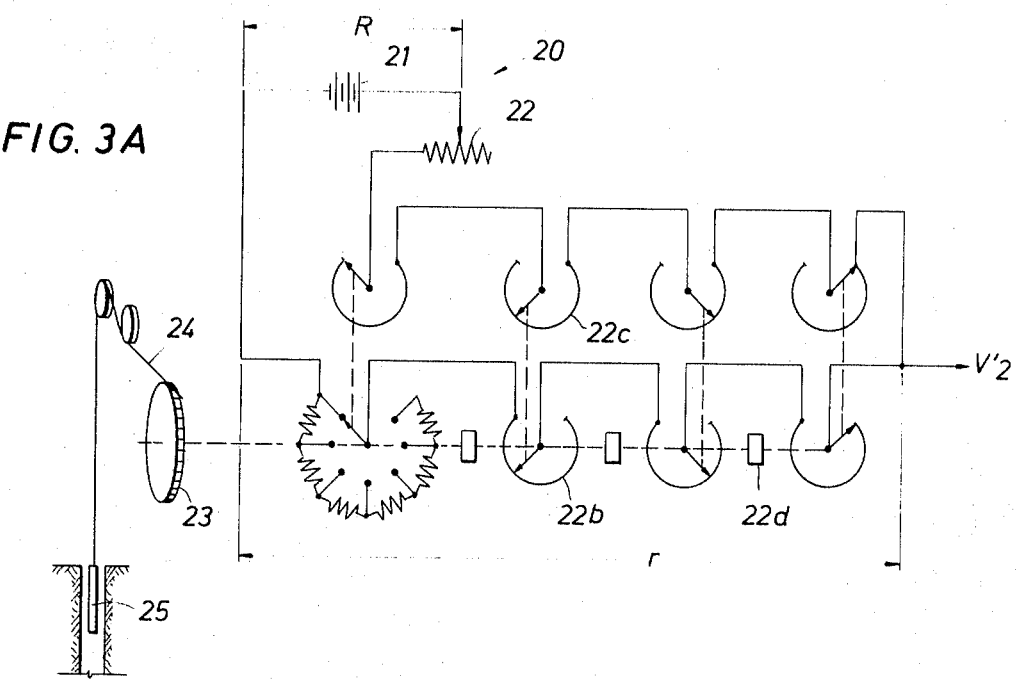
FIG. 3A is a partial diagram corresponding to a variant of the apparatus of FIG. 3

In the prior art thermal log version such as shown in FIG. 1, the thermometric voltage signal received at the input of the recording device is of the form:

$$V = Gz + V(z) \quad \quad 1.$$

where G is the geothermal gradient, z the depth of the sonde and V (z) the term representing the thermal anomaly at the said depth.

To this signal voltage V is added a fixed adjustable voltage $v_1$ furnished by a scaling circuit 10 comprising a battery 11, or other DC voltage source, and a potentiometer 12. The sum voltage is applied to a galvanometer 13 via a voltage divider 14. The galvanometer 13 records in the usual manner on film the uncorrected thermal log $$V_1 = Gz + V(z) + v_1 \quad \quad 2.$$

From the signal voltage V is subtacted a continuously variable voltage (E) $r/R$ provided by a correction circuit 20 comprising a battery 21, or other DC voltage generator E, and a potentiometer 22 with an adjustable travel. The instantaneous resistance value $r$ of the potentiometer 22 is determined by the sliding contact 22a, which is driven along its travel by the rotation of the measuring wheel 23 over which passes the logging cable 24 carrying the thermometric sonde 25. Under these conditions, we have:

$r = \lambda z$ where $\lambda$ is a constant coefficient
If R is chosen so that:

$$(E \lambda z)/(R) = Gz \text{ taking } R = (E \lambda)/(G)$$

we see that the voltage on the sliding contact 22a is finally $$V'_2 = Gz + V(z) - (E) r/R = V(z) \quad \quad 3.$$

To this corrected voltage is added, as above, a fixed adjustable voltage $v$ supplied by a scaling circuit 30 comprising a battery 31, or other DC voltage generator, and a potentiometer 32. The resultant signal is applied to a galvanometer 33 via a voltage divider 34. The potentiometer 33 thus supplies to the galvanometer 33a thermal log without geothermal gradient $$V_2 = V(z) + v_2 \quad \quad 4.$$

It is possible to calculate R in the apparatus of FIG. 3 as a predetermined function of the thermal gradient (which is assumed to be known) and of the temperature-voltage characteristic of the thermometric sensor. It is, however, more expedient to set it experimentally by using the following procedure.

The thermometric sonde is lowered in the bore hole to a depth of about 150 meters, experience having shown that the gradient generally appears clearly just beyond this depth. The light spot of the galvanometer 33 is then adjusted on the middle line of the film strip. The driving device of the sliding contact 22a of the potentiometer 22 is started up and during the following 30 meters or so of the lowering of the sonde, R is set so that the spot remains substantially on the middle line of the recording medium. The actual recording of the temperature log of the well is then begun.

The resistance of the potentiometer 22 may consist partly of the series resistors of a conventional mechanically controlled decade type meter. Each decade comprises, as known in the art, two potentiometers with coupled sliding contacts, one of which is a measuring potentiometer such as 22b of FIG. 3A and the other a ten's complement potentiometer such as 22c. The decades are connected pairwise by a 1/10 reducer such as 22d. Of course, all the potentiometers 22b are identical, although only one has been shown in detail as having switch contacts and windings between the contacts. Such a device is capable of compensating the geothermal gradient over a depth for example of about 5,000 meters.

Figure 4:
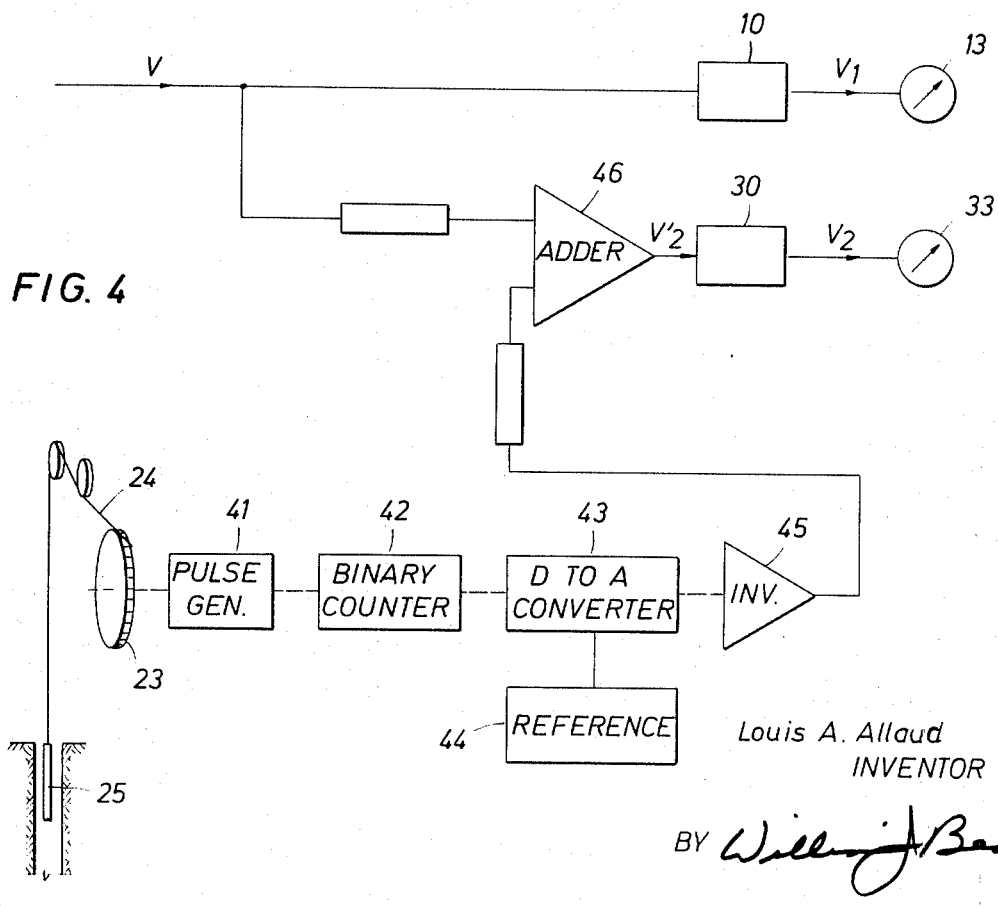
FIG. 4 is a layout diagram of an apparatus according to the invention (digital-analog version).

FIG. 4 depicts a digital embodiment which differs from that of FIG. 3 in the following respect. The measuring wheel 23 is mechanically coupled to a pulse generator 41 followed by a binary pulse counter 42 and a digital-to-analog converter 43. The reference element 44 permits the calibration of the output signal Gz as function of G. An inverter 45 performs the sign change for subtracting the correction signal and finally a second operational amplifier 46 used as an adder and gives the corrected voltage V(z). Scale circuits 10 and 30 are the same as previously referred to with respect to FIG. 3.

Suppose, for example, that the pulse generator 41 has been set so as to generate a pulse every 15 cm during lowering and that the binary counter is composed of 15 bits or binary digits. Such an apparatus makes it possible to cover an interval of $$0.15 \times (2^{15} - 1) \cong 5{,}000 \text{ m}$$

In practice, one can consider as satisfactory a continuous take-up system over 2,500 meters, and even over 1,250meters (provided, for exceptional cases, that a scaling circuit 30, similar to the scaling circuit 30 of the preceding figures is inserted). This makes possible a considerable reduction in the ranges covered by the pulse counter and especially by the digital-to-analog converter 43.

It will be noted that the embodiments disclosed make it possible to obtain the geothermal gradient immediately. It is evident that the process of the invention may also be implemented for delayed processing such as by means of a remote program controlled digital computer. To accomplish this, the digital magnetic recording of the temperature of the well as a function of its depth is performed. A first computer pass through the data can then determine the geothermal gradient of the borehole from the average slope of a relatively even portion of the temperature recording. Using this data, the computer can generate a signal representative of the corrected temperature deviations having subtracted out the temperature resulting only from the geothermal gradient. This signal can be recorded in turn either directly in digital form on magnetic tape or, after conversion into analog form, on a photographic film type recorder.

It is apparent that the above disclosure may suggest to those skilled in the art other alternative embodiments. Accordingly, it is the aim in the appended claims to cover all such variations as fall within the true spirit and scope of the invention.

What is claimed is:

1. A method for recording thermal anomaly signals resulting from temperature logs in a well borehole comprising the steps of:

generating, at successive borehole depths, first signals representative of the temperature at each such borehole depth;

generating a signal representative of the geothermal gradient in the borehole;

generating second signals representative of the product of the geothermal gradient signal and the borehole depth at successive borehole depths;

combining said first and second signals to generate a third signal representative of only thermal anomalies in the borehole as a function of borehole depth; and recording said third signal as a function of borehole depth.

2. The method of claim 1 and further including the step of simultaneously recording said first signal and said third signal as a function of borehole depth.

3. The method of claim 1 wherein the step of combining said first and second signals is performed by subtracting said second signal from said first signal to generate said third signal.

4. The method of claim 1 wherein the step of generating said geothermal gradient signal is performed by generating the average slope of the temperature variations along a portion of the borehole exhibiting a minimum of thermal anomalies.

5. Apparatus for recording thermal anomaly signals resulting from temperature logs in a well borehole comprising;

means for generating at successive borehole depths, first signals representative of the temperature at each such borehole depth;

means for generating a signal representative of the geothermal gradient in the borehole;

means for generating second signals representative of the product of the geothermal gradient signal and the borehole depth at successive borehole depths;

means for combining said first and second signals to generate a third signal representative of only thermal anomalies in the borehole as a function of borehole depth; and means for recording said third signal as a function of borehole depth.

6. The apparatus of claim 5 and further including means for simultaneously recording as a function of borehole depth said first signal and said third signal.

7. The apparatus of claim 5 wherein said means for generating said third signal includes means for combining said first and second signals by subtracting said second signal from said first signal.

8. The apparatus of claim 5 wherein said means for generating said second signal includes;

a constant voltage DC source;

a potentiometer having an output terminal and a sliding contact mechanically coupled to a measuring wheel, said measuring wheel being driven by movement of a well logging cable, and said sliding contact being electrically coupled to said constant voltage D.C. source, whereby movement of said measuring wheel mechanically moves said potentiometer sliding contact generating a D.C. output voltage at said output terminal comprising said second signal.

9. The apparatus of claim 5 wherein said means for generating said second signal includes;

a measuring wheel capable of being driven by movement of well logging cable;

pulse generator means, responsive to movement of said measuring wheel, for generating pulse signals at predetermined increments of motion of said wheel;

counting means for counting said pulse signals;

reference pulse means for generating reference pulses at a rate proportional to the borehole geothermal gradient; and digital to analog converter means responsive to said reference pulses for producing an analog signal representative of the contents of said counting means upon receipt of a predetermined number of said reference pulses.

* * * * *